United States Patent
Carstens et al.

(10) Patent No.: US 6,341,430 B1
(45) Date of Patent: Jan. 29, 2002

(54) AUTOMATED GUIDANCE VEHICLE GUIDE PATH CODE TEMPLATES AND METHODS FOR USE

(75) Inventors: Anthony P. Carstens, New Albany; Keith Shields, Mount Victory, both of OH (US)

(73) Assignee: Honda of America Mfg., Inc., Marysville, OH (US)

(*) Notice: Subject to any disclaimer, the term of this patent is extended or adjusted under 35 U.S.C. 154(b) by 0 days.

(21) Appl. No.: 09/535,311

(22) Filed: Mar. 24, 2000

(51) Int. Cl.⁷ .............................. G01B 3/14; G01B 5/14
(52) U.S. Cl. ...................................................... 33/563
(58) Field of Search ........................... 33/563, 562, 564, 33/565, 566; 180/167, 168; 235/375, 384, 410, 411, 412

(56) References Cited

U.S. PATENT DOCUMENTS

| | | | | |
|---|---|---|---|---|
| 2,690,017 A | * | 9/1954 | Neill ............................ 33/563 |
| 3,846,915 A | * | 11/1974 | Obermark et al. ............. 33/563 |
| 3,857,184 A | * | 12/1974 | Burkin et al. .................. 33/563 |
| 3,935,922 A | | 2/1976 | Cooper et al. ............... 180/168 |
| 3,970,840 A | | 7/1976 | De Bruine .................... 250/202 |
| 4,003,445 A | | 1/1977 | De Bruine .................... 180/168 |
| 4,307,791 A | | 12/1981 | De Bruine .................... 180/168 |
| 4,362,928 A | * | 12/1982 | Sheldon ........................ 235/375 |
| 4,379,497 A | | 4/1983 | Hainsworth et al. ......... 180/168 |
| 4,566,192 A | * | 1/1986 | Hankins et al. ................ 33/1 B |
| 4,591,704 A | * | 5/1986 | Sherwood et al. ........... 235/380 |
| 4,675,513 A | * | 6/1987 | Kuze ............................ 235/375 |
| 4,707,297 A | | 11/1987 | Paske, Jr. et al. ......... 252/301.16 |
| 5,277,839 A | | 1/1994 | Schultz ................... 252/301.24 |
| 5,602,382 A | * | 2/1997 | Ulvr et al. .............. 235/462.02 |
| 5,814,961 A | * | 9/1998 | Imahashi ..................... 318/587 |

* cited by examiner

Primary Examiner—Diego Gutierrez
Assistant Examiner—R. Alexander Smith
(74) Attorney, Agent, or Firm—Alan T. McDonald; Vince Ciamacco; Standley & Gelcrest LLP (57) ABSTRACT

Code block or code marking application, removal, and replacement templates and methods for use for code blocks and code markings that are used in conjunction with the guide path, guide line, and guide tracks used by automated guidance vehicles (AGVs), which are otherwise known as autonomous guidance, automatic guidance, and automatically or autonomously guided vehicles. Guide line code blocks are typically applied to the floor of a factory, warehouse, or other facility that employs AGVs, which can sense the guide lines and/or the code blocks for purposes of maneuvering payloads while navigating through the facility. The AGV code template includes a generally planar template substrate configured with corresponding control and alignment aperture patterns formed in the template that are offset from each other. A plurality of spaced-apart code spur openings form the control and alignment aperture patterns wherein each of the openings of the control aperture pattern corresponds with an offset opening of the alignment aperture pattern and represents a code spur that is typically designated either a start, finish, on, off, or synchronization bit.

20 Claims, 7 Drawing Sheets

AUTOMATED GUIDANCE VEHICLE GUIDE PATH CODE TEMPLATES AND METHODS FOR USE

TECHNICAL FIELD

This invention relates to code templates and methods for use that are needed for the application, removal, and replacement of code markings and code blocks, which are used by automated guidance vehicles (AGV) that move about a floor of a factory, warehouse, or other facility by recognizing and following various types of guide paths, guide lines, and guide tracks. Such guide lines are usually used in conjunction with a wide variety of code markings and/or code blocks, which are encoded with various kinds of information such as positional location codes and synchronization codes that can be sensed and decoded by the AGV for purposes of maneuvering payloads while navigating through the facility. Such AGVs are also commonly referred to in the industry as autonomous guidance, automatic guidance, and automatically or autonomously guided vehicles.

BACKGROUND OF THE INVENTION

Factories, warehouses, and other types of industrial and manufacturing facilities have seen an increased use of AGVs in daily operations. The AGVs are employed in a wide variety of duties and are capable of a wide range of autonomous and/or preprogrammed operations. The AGVs can serve in a wide range of duties including automatically moving products, parts, and people safely, efficiently, and quickly about the facility. Often, AGVs are presently used by inventory storage and order picking systems in warehouses, and by assembly-line manufacturers who require just-in-time delivery from one factory location to another of raw materials, parts, partially or completely assembled automotive components.

In most applications, AGVs move about the floor space of the factory, warehouse, airports, or other type of facility along pre-designated paths. The paths are designated and identifiable to the AGVs in a number of ways, which include, to name only a few, 1) preprogramming the paths or tracks into the AGV computer memory banks; 2) installation of trackways, railways, guide-wires, and other types of prepositioned cables, electrical, and electromechanical devices; 3) prepositioning of AGV recognizable targets; 4) prepositioning of magnetic, energizable, and energy emitting and reflective devices, including specially formulated paints, tapes, and other substances and materials that are applied to floor path and guide ways; and 5) various combinations of the preceding systems.

Ordinarily, the most cost effective systems employ a predesignated path way, guide path, or guide track, which includes a guide line that is applied to the floor surface along the predesignated path way or paths. The AGV is configured to recognize the guide line for purposes of achieving navigational control and accurate movement of the AGV's payload, whether it be people moving across an airport or material moving quickly through an assembly line. Such guide lines can be employed either alone or in combination with any of the previously described systems. The guide lines or tracks are also typically used in conjunction with various types of code markings that are applied to the floor surface, proximate to or along the guide line. Such code markings or code blocks are usually encoded with specific information that can describe a location within the facility. Such code blocks can also serve as way points for various types of AGVs that may be employed and configured for different or cooperative functions. The AGV is usually configured to recognize the code blocks for purposes of speed control, location and way point identification, distance measurement, and for synchronization of on-board distance measuring and location identification devices.

AGVs and guide line marking systems have been in use for some time and are described in more detail in the prior art, which includes U.S. Pat. Nos. 3,935,922 to Cooper et al.; 4,003,445 to DeBruine; and 4,379,497 to Hainsworth et al.; which are all incorporated herein by reference in their entirety. Each of these references also specifically describes various types of guide line and code marking systems.

The code marking systems are recognized by AGV sensing systems that create signals used by on-board control systems. The control systems can thereby establish the AGV's location in the facility, effect navigational control during transit of the AGV, as well as calibrate and synchronize other AGV parameters such as distance measurement sensors, payload disposition controllers, and directional control subsystems. Additional types of navigational control systems and guide line sensing devices configured for use with AGVs are described in U.S. Pat. Nos. 3,970,840 and 4,307,791, both to DeBruine.

Various types of materials have been used to apply code markings to floor surfaces. U.S. Pat. Nos. 4,707,297 to Paske, Jr. et al. and 5,277,839 to Schultz, which are incorporated herein by reference in their entirety, disclose a variety of compounds that may be useful for purposes of applying a guide line to a floor surface, and which are compatible for use with the previously described AGVs and for purposes of the present invention.

The prior art devices have demonstrated that the location of the guide tracks and lines and the precision location of various types of code markings and code blocks can significantly simplify the operation and improve the performance of AGVs during transit. The large majority of AGVs are configured to measure distances during transit in addition to being equipped to follow predesignated path lines or guide tracks that are applied to the floor surface. In most configurations, the AGVs measure the distance traveled in units of length. They also scan for the prepositioned guide line for purposes of remaining within the bounds of the predesignated path way during transit through the facility. In addition to scanning for the guide line, the AGVs are also configured to scan for various types of location and synchronization code markings. Such markings are often arranged in the form of a block of markings positioned on or proximate to the guide line. The location code markings are usually placed in positions, such as intersections on aisles and path ways in the facility, where various different AGVs may need to go in different directions that depend on the final destination of the AGV's payload. Thus, those with skill in the art have come to appreciate that a code block that is misplaced even by a few inches or centimeters can adversely impact the proper operation of the AGVs. This effect is even more pronounced in large facilities such as airports, warehouses, and manufacturing operations where AGVs must transit accurately across large distances.

During routine transit through the facility, the AGV may need to recalibrate its distance measuring equipment because many such measuring systems experience decay in the accuracy of the distance measured over time. Thus, regular resynchronization is needed to minimize inaccuracies in the distance measuring equipment. The synchronization code markings are typically situated at many locations throughout the facility and proximate to the guide line.

To minimize inaccuracy in measuring distance, the AGV scans for the prepositioned synchronization code markings or code block, which contains encoded distance measuring information, to recalibrate the onboard distance measuring systems. Such recalibration enables more accurate AGV speed control and distance measurements, which, in turn, prevents collisions and improves the overall accuracy and efficiency of AGV movement through the facility.

Some attempts have been made to improve the accuracy with which AGV users, such as facilities engineers, apply the code markings and code blocks to floor surfaces. Such attempts include use of a template configured with cut-outs that correspond to the various possible code markings. The template can be used to assist in precise placement of the location and synchronization code markings proximate to the guide line or track. However, the templates presently in use suffer from many shortcomings, which include, for example, the lack of any features that allow the efficient removal and accurate replacement of code markings that have become damaged or worn over time. Additionally, no device exists that can easily assist the user with determining the positional and informational accuracy of the various types of code markings before and after application to the floor surface.

As has often been experienced, the application, removal, and reapplication of code markings often results in improperly located code markings, or in the application of code markings that are incorrect, and which convey inaccurate location information. Improperly positioned code markings can cause the AGV to turn to soon or too late along the guide line, which can cause a collision and damage to a payload. Incorrectly applied code markings that contain improperly coded information can result in the AGV obtaining inaccurate location or synchronization information, which can result in a wide variety of operational errors.

In most cases, when an error condition is experienced, the AGV is preprogrammed to initiate an error mode that stops the vehicle, sounds off or sends an alert message, and discontinues autonomous operation until a user intervenes and corrects the error condition. The AGV error mode may prevent accidental collisions or unexpected travel along improper path ways. However, in a facility that has more than one AGV in operation, and some facilities may employ dozens of autonomously operating AGVs, if one AGV stops, then all other AGVs must also stop if they move along the same path way and/or follow the same guide line that has the inaccurate or improperly placed code markings or code block. This can result in an AGV traffic jam that can result in countless hours of lost production time, which, in turn, results in a significant loss of revenue and operating efficiency. For a facility such as an airport or automotive manufacturing assembly line factory, which usually operate around the clock, the delays and missed flight connections cannot be undone, and the lost production time can not be recovered.

None of the preceding references disclose or suggest the use of a code marking template that can prevent the type of placement and coding errors described above and that has the benefits of the present invention. What has been needed, but heretofore unavailable, is an improved, more efficient, and user friendly device and method for applying, removing, and replacing code markings and code blocks that are compatible for use with the many types of AGV code marking systems presently in use. As is known to those with skill in the art, and especially to those with experience in using AGVs in the harsh environments associated with the automotive, assembly-line manufacturing industry, the guide lines or tracks become damaged and worn over time because many users travel across the designated path ways and can damage the guide lines and code blocks with an undesirable but regular frequency. Thus, a reliable and accurate device is needed to minimize the time required to apply, remove, and replace the code markings needed by AGVs so that they can operate efficiently and without error.

Accurate placement and coding of AGV code markings can eliminate expensive production and operating delays. Moreover, routine maintenance of normal code marking wear and tear can be greatly simplified for the facilities engineer responsible for the application, removal, and replacement of code markings. A significant amount of time is required to initially preposition a code marking and code block in the proper location. Once it is accurately located and applied to the floor for the first time, a considerable amount of time must be expended to precisely measure the location of the code block so that the AGV(s) that must rely upon the code block can be precisely programmed with the exact distance to or from and location of the code block. As stated, this is required because most AGVs are configured to precisely measure the distance between the various code markings and code blocks. Once the code block location is established and preprogrammed into the AGV(s), removal and replacement, after wear and tear or damage has occurred, must be at the precise location as originally prepositioned. Any deviation from the original position requires a considerable amount of re-measuring of the code marking location and re-programming of the AGV(s). Any reduction in the likelihood of error during the code marking application process can have a positive impact on the bottom line of any facility that employs AGVs that use guide lines and code markings. This is especially true in the automotive assembly-line manufacturing operations where even the smallest delay in the "justin-time" manufacturing processes can result in an unexpectedly large increase in costs and a major decrease in operational efficiency.

The AGV guide path code templates and methods for use of the present invention offer a solution to the problem of improper code marking placement and the problem of applying code markings that are encoded with incorrect information. The novel and inventive solution accomplishes this with a simple and efficient device and method for use that demonstrates a significant improvement when compared with previous devices and methods, and which more readily meets the requirement for precisely located and properly coded code markings, which are needed for proper and error-free operation of AGVs.

SUMMARY OF THE INVENTION

In general, the present invention relates to automated guidance vehicle (AGV) guide path code templates and methods for use for improved application, removal, and replacement of AGV guide line code markings, which are otherwise referred to as code blocks. The automated guidance vehicle code template for creating location code markings or code blocks according to the present invention includes a generally planar template substrate that is formed with control and alignment aperture patterns that are correspondingly offset from each other. The control and alignment patterns are formed with a plurality of spaced-apart code spur openings wherein each of the openings of the control aperture pattern corresponds with an offset opening of the alignment aperture pattern. In both patterns, each opening represents either a synchronization, start, finish, on, or off bit that is contained in the guide line code marking.

The code template further includes a series of indicia that corresponds to each of the code spur openings and which is representative of a control spur bit identifier. For example, a typical code marking block may include as few as 4 or as many as 10 bits. In either configuration, a start bit and a finishing bit are, in most cases, included in the code marking. The respective, remaining 2 to 10 bits represent binary code digits that in turn represent a base two exponent and a base 10 number. If 2 bits are used, then each binary digit corresponds to a base two exponent between 0 and 1, which, in turn, corresponds to a base 10 number between 1 and 2. For example, $2^0=1$ and $2^1=2$. If 10 bits are used, with a start and a finish bit that leaves 8 bits for numeral representation, then each binary digit corresponds to a base two exponent between 0 and 7, and a base 10 number between 1 and 128. The indicia identify the bit as either a start, finish, or digit identifier bit. Additional indicia may be included as described in more detail below in connection with the various figures.

In a variation of the preceding embodiment, the automated guidance vehicle code template is preferably formed with the plurality of code spur openings wherein each pattern includes at least a start framing bit opening and a finish framing bit opening. More preferably, the code template is formed with the plurality of code spur openings of each pattern including start and finish framing bit openings and at least 2 on bit and 2 off bit code spur openings. Even more preferably, the code spur openings of each pattern includes start and finish framing bit openings and at least 8 on bit and 8 off bit code spur openings.

The present invention also contemplates an automated guidance vehicle code template for creating synchronization code markings. This variation of the present invention further includes a generally planar template substrate that has control and alignment aperture patterns formed therein that are correspondingly offset from each other. A plurality of spaced-apart code spur openings forms the control and alignment aperture patterns wherein each of the openings of the control aperture pattern corresponds with an offset opening of the alignment aperture pattern and represents either a synchronization (hereafter "sync") on or sync off bit. This variation further preferably includes a series of indicia corresponding to each of the code spur openings and that is representative of a control spur bit identifier.

A kit of automated guidance vehicle code templates for creating synchronization and location code markings is also described according to the principles of the present invention, The kit includes a plurality of generally planar code templates each having control and alignment aperture patterns that are correspondingly offset from each other and that are formed in the templates. A plurality of spaced-apart code spur openings form the control and alignment aperture patterns. Each of the code spur openings of the control aperture pattern corresponds with an offset opening of the alignment aperture pattern and represents either a start, finish, on, off, sync on, or sync off bit. Each of the code templates in the kit further includes a series of indicia corresponding to each of the code spur openings and that represents a control spur bit identifier. Preferably, the kit includes code templates wherein the plurality of code spur openings of each pattern includes at least a start framing bit opening and a finish framing bit opening. More preferably, the kit of code templates is configured wherein the plurality of code spur openings of each pattern includes start and finish framing bit openings and at least 2 on bit and 2 off bit code spur openings. Even more preferably, the kit of code templates is arranged wherein the plurality of code spur openings of each pattern includes start and finish framing bit openings and at least 8 on bit and 8 off bit code spur openings.

In a variation of the kit form of the instant invention, each of the plurality of code spur openings forming the control pattern corresponds with an opening of the alignment aperture pattern and represents either a sync on or sync off bit. More preferably, each of the plurality of code spur openings forming the control pattern corresponds with an offset opening of the alignment aperture pattern and represents either a sync on or sync off bit; and the plurality of spaced-apart code spur openings also includes start and finish framing bit openings and at least 2 on bit and 2 off bit code spur openings. Most preferably, the kit of this variation is adapted wherein the plurality of code spur openings forming the control pattern corresponds with an offset opening of the alignment aperture pattern and represents either a sync on or sync off bit; and wherein the plurality of code spur openings includes start and finish framing bit openings and at least 8 on bit and 8 off bit code spur openings.

The present invention is also directed to a method for removing and replacing automated guidance vehicle code markings using a code template for creating location code markings. The method includes the steps of:

a. identifying an original code marking that has become damaged or worn;

b. selecting a code template that includes a generally planar template substrate having control and alignment aperture patterns formed in the template and correspondingly offset from each other and a plurality of spaced-apart code spur openings forming the control and alignment aperture patterns wherein each of the openings of the control aperture pattern corresponds with an offset opening of the alignment aperture pattern and represents either a sync on, sync off, start, finish, on, or off bit;

c. placing the code template over the damaged or worn code marking and aligning the control aperture pattern with the code marking to be removed and replaced;

d. temporarily marking the code spurs in the alignment pattern with offset traces that correspond to the code spurs of the original code marking;

e. removing the code template from the original code marking area;

f. preserving the offset code spur traces that were marked using the alignment aperture pattern;

g. removing the damaged or worn code marking spurs;

h. placing and positioning the code template to align the alignment aperture pattern with the preserved code spur traces;

i. marking the code spurs in the control aperture pattern corresponding to the preserved code spurs in the alignment aperture pattern; and j. applying replacement code spurs.

In a variation of the preceding method, the method further includes the steps of identifying and annotating the information represented by the damaged or worn code spurs before removal and verifying the accuracy of the information represented by the code spurs marked in the alignment aperture pattern before the replacement code spurs are applied to the floor, wall, or other target. Another variation includes the step of preparing the floor, wall, or other target surface where the damaged or worn code spurs were removed before applying the replacement code spurs. The step of removing the temporarily marked code spurs after application of the replacement code spurs is also contemplated by the method of the present invention. The present invention is also directed to a method that includes a step wherein a sealer is applied to the replacement code spurs to improve resistance of the code spurs to damage and wear.

BRIEF DESCRIPTION OF THE DRAWINGS

Without limiting the scope of the present invention as claimed below and referring now to the drawings, wherein like reference numerals and numerals with primes across the several views refer to identical, corresponding, or equivalent features and parts:

DESCRIPTION OF THE PREFERRED EMBODIMENTS

The automated guidance vehicle (AGV) guide path code templates and methods for use of the present invention reduce the possibility, among other problems, of improper code marking and code block placement and increases the likelihood that code blocks are properly encoded with correct information. The invention significantly improves the accuracy with which a facility engineer can precisely locate and accurately replace an AGV code marking and code block that has become damaged or worn. The problems of wear and damage to code markings is markedly pronounced in harsh and high-traffic manufacturing environments such as automotive assembly lines, as well as in airports and high-volume warehousing facilities. Damaged and/or worn guide line code markings can be removed and replaced with higher precision and accuracy in only a fraction of the time required in the past when the present invention is used properly.

Figure 1:
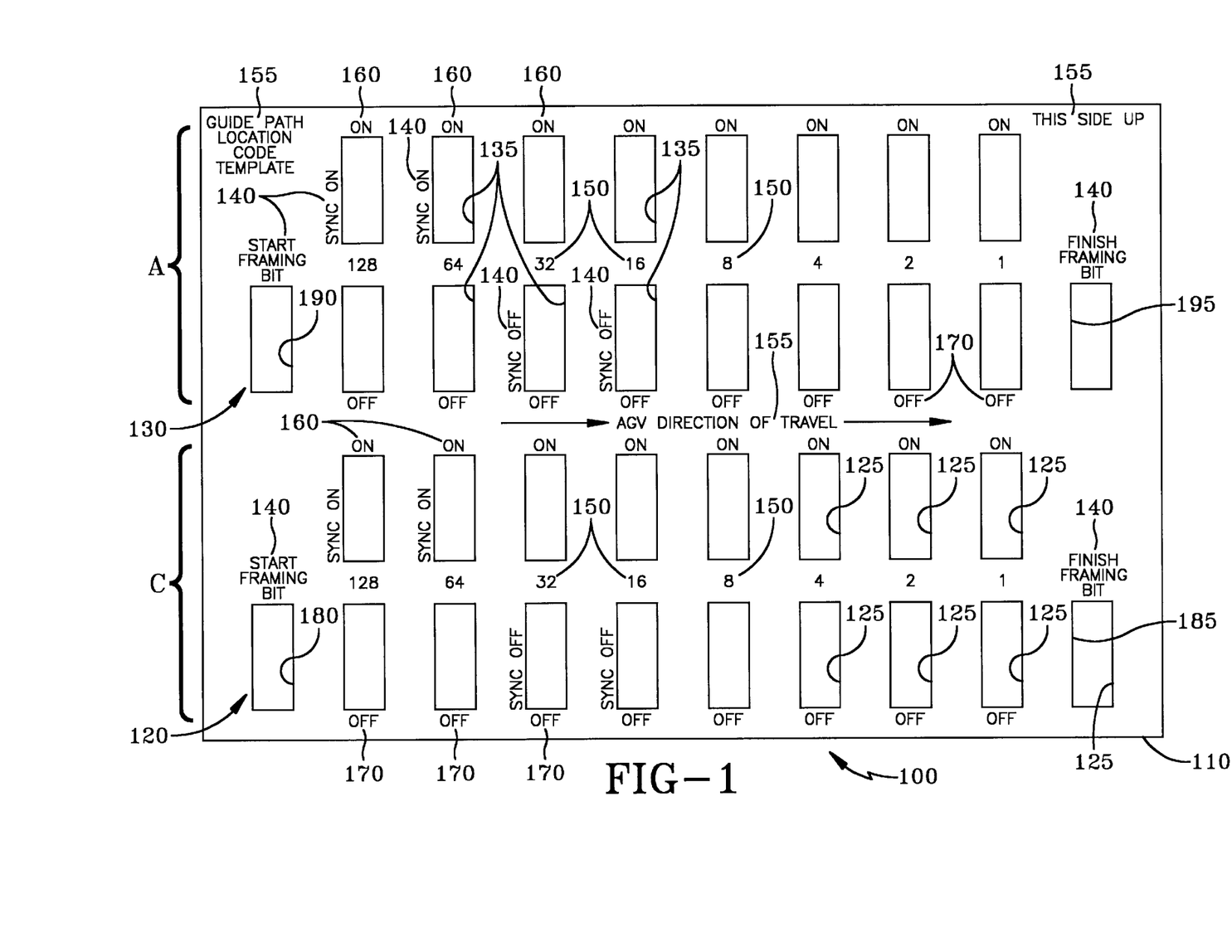
FIG. 1 is a plan view, in reduced scale, of a guide line code marking and code block template according to the present invention.

The present invention establishes a significant advance over the previously known devices and methods and the advance is achieved with improved simplicity and without any significant increase in cost. With reference to FIG. 1, an AGV guide path code template 100 is shown that is adapted for creating location code markings. The template 100 includes a generally planar template substrate 110 that is formed with control and alignment aperture patterns, designated generally by reference letters "C" and "A", respectively. The patterns C and A are correspondingly offset from one another. The control and alignment patterns C, A are formed with a plurality 120, 130 of code spur openings 125, 135 wherein each of the openings 125 of the control aperture pattern C corresponds with an opening 135 of the alignment aperture pattern A. In either pattern C, A, each opening 125, 135 represents either a start, finish, on, off, synchronization on, or synchronization off bit that is contained in the guide line code marking block.

The code template substrate 110 is preferably formed from any relatively planar paper, plastic, or metal material that is capable of withstanding use for the intended purpose. More preferably, the substrate 110 is formed from a plastic material such as, for example, Lexan® having a thickness of approximately between 0.125 inches and 0.375 inches, and even more preferably approximately 0.250 inches.

The code template 100 further includes a series of indicia 140, 150 that correspond to each of the code spur openings 125, 135 and which represents of a code spur bit identifier. Code spurs form one of many types of code blocks that can be recognized by AGVs. For example, a typical code marking block is designated by reference numeral 400 and shown in FIG. 4. This figure is described in more detail below. The code block 400 may include, for example and without limitation, between 2 and 10 bits of encoded information, and more preferably 10 bits of information. However, the template device 100 and method of the present invention are compatible for use with a wide range of code marking blocks having any number of code spurs or encoded bits of information that represent any number of bits, bytes, words, or other means of encoding information that is recognizable by AGVs. Code blocks in the form explicated here are presently in wide use. However, the present invention can be easily adapted to be compatible for use with many types of code blocks that are different in shape, design, and form than those described herein.

Figure 4:
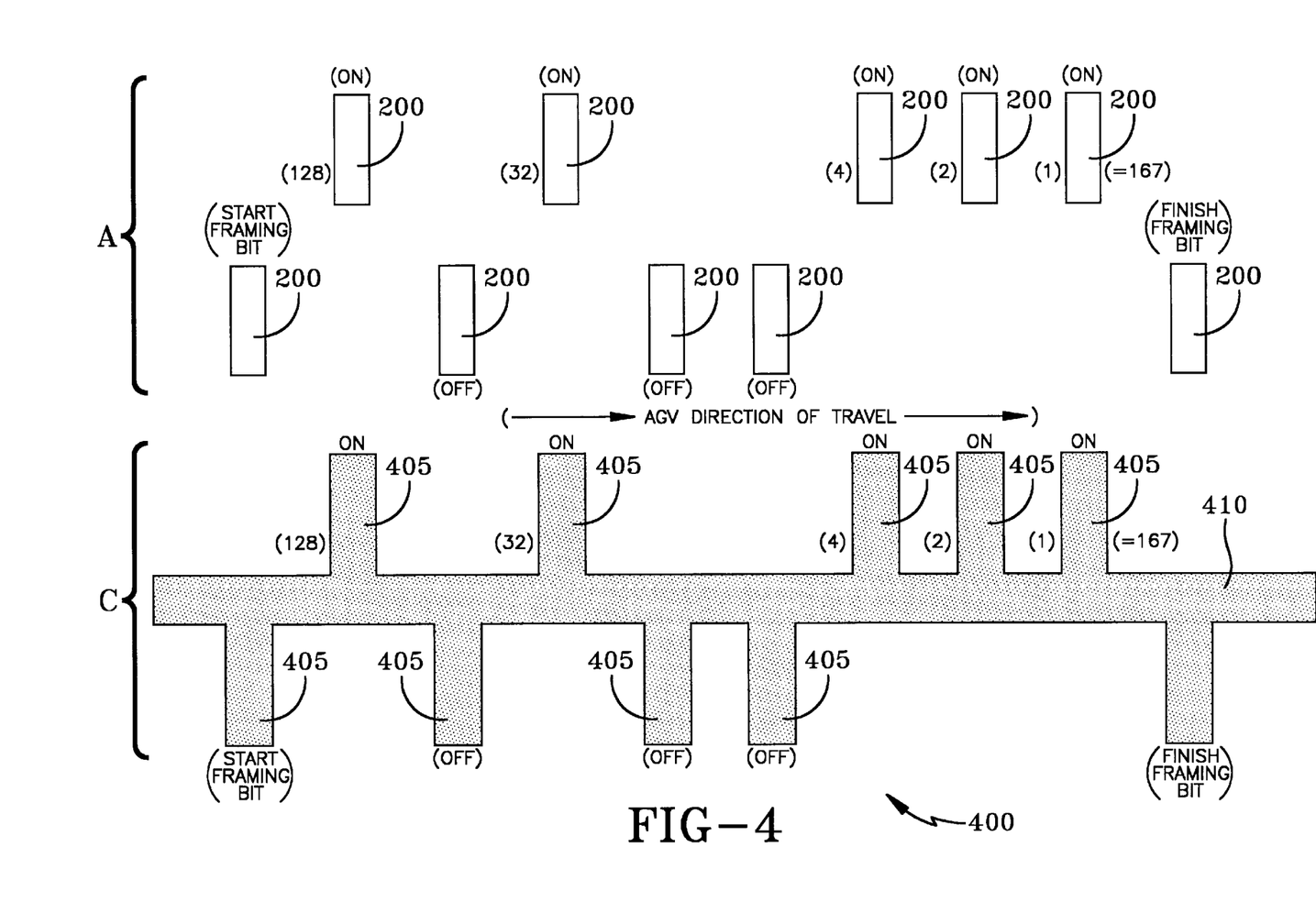
FIG. 4 is a plan view of code markings that have been applied using the code template of FIG. 1.

For purposes of illustration and not limitation, the 10 bit configuration described here and in the accompanying figures includes a start bit 180 and a finishing bit 185, which are encoded in the code marking block 400 as code spurs 405. The remaining 8 bits of information represented by the other code spurs 405 of the code block 400 each represent a binary code digit, which are designated as a base two exponent of, for example but not for limitation, between 0 and 7. The combined bits or digits and the base 10 number that they represent can encode a location code or other piece of information that can be used by the AGVs. For purposes of illustration, the 8 bits or base two exponentials collectively are representative of any base 10 number between 1 and 128. As a further example of this representation or encoding system wherein base two numbers represent base ten numbers is shown by the following series: $2^0=1$, $2^1=2$, $2^2=4, \ldots 2^7=128$. With continued reference to FIG. 1, it will be understood that the indicia 140, 150 on the template 100 identify the code block bit that corresponds with the code spur openings 125, 135 as either a start, finish, or exponent bit or digit identifier, or a synchronization on or off bit. Additional indicia 155 may be included as shown in the accompanying figures.

With continued reference to FIG. 1, it can be understood by those with skill in the art that each aperture pattern C and A includes two aligned rows of code spur openings 125, 135 of the plurality 120, 130. As can be understood with continued reference to FIG. 1, the code spur openings 125, 135 of the plurality are aligned in rows and are designated with additional indicia 160, 170, that respectively identify the code spur openings as either an "on" bit or an "off" bit. The on bit code spurs 160, when applied as the code block are identified and recognized by the AGV sensors as the corresponding base 2 exponent and corresponding base 10 number. The off bit code spurs 170 are similarly recognized to indicate that the corresponding base 2 exponent is not used.

In a variation of the preceding embodiment, the automated guidance vehicle code template 100 is preferably formed with the plurality 120, 130 of code spur openings 125, 135 wherein each pattern C, A includes at least a start framing bit opening 180, 190 and a finish framing bit opening 185, 195. More preferably, the code template is formed with the plurality 120, 130 of code spur openings 125, 135 of each pattern C, A including start and finish framing bit openings 180, 185, 190, 195 and at least 2 on bit and 2 off bit code spur openings of the plurality 120, 130. Even more preferably, the code spur openings of each pattern include start and finish framing bit openings and at least 8 on bit openings 125, 135 and 8 off bit code spur openings 125, 135.

Figure 2:
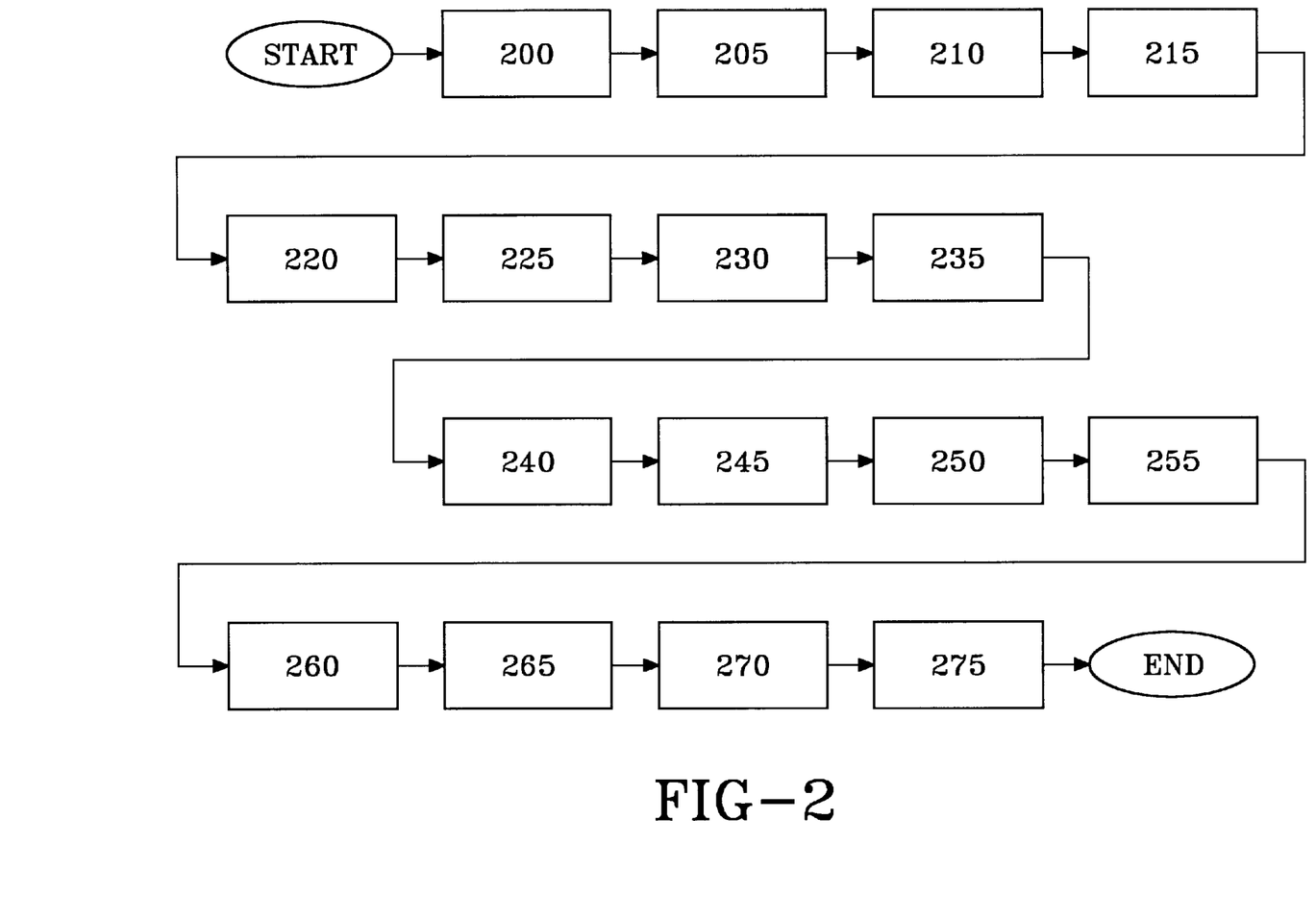
FIG. 2 is a flow chart that demonstrates the method of application, removal, and replacement of code markings and code blocks using the code block marking template of FIG. 1
Figure 3:
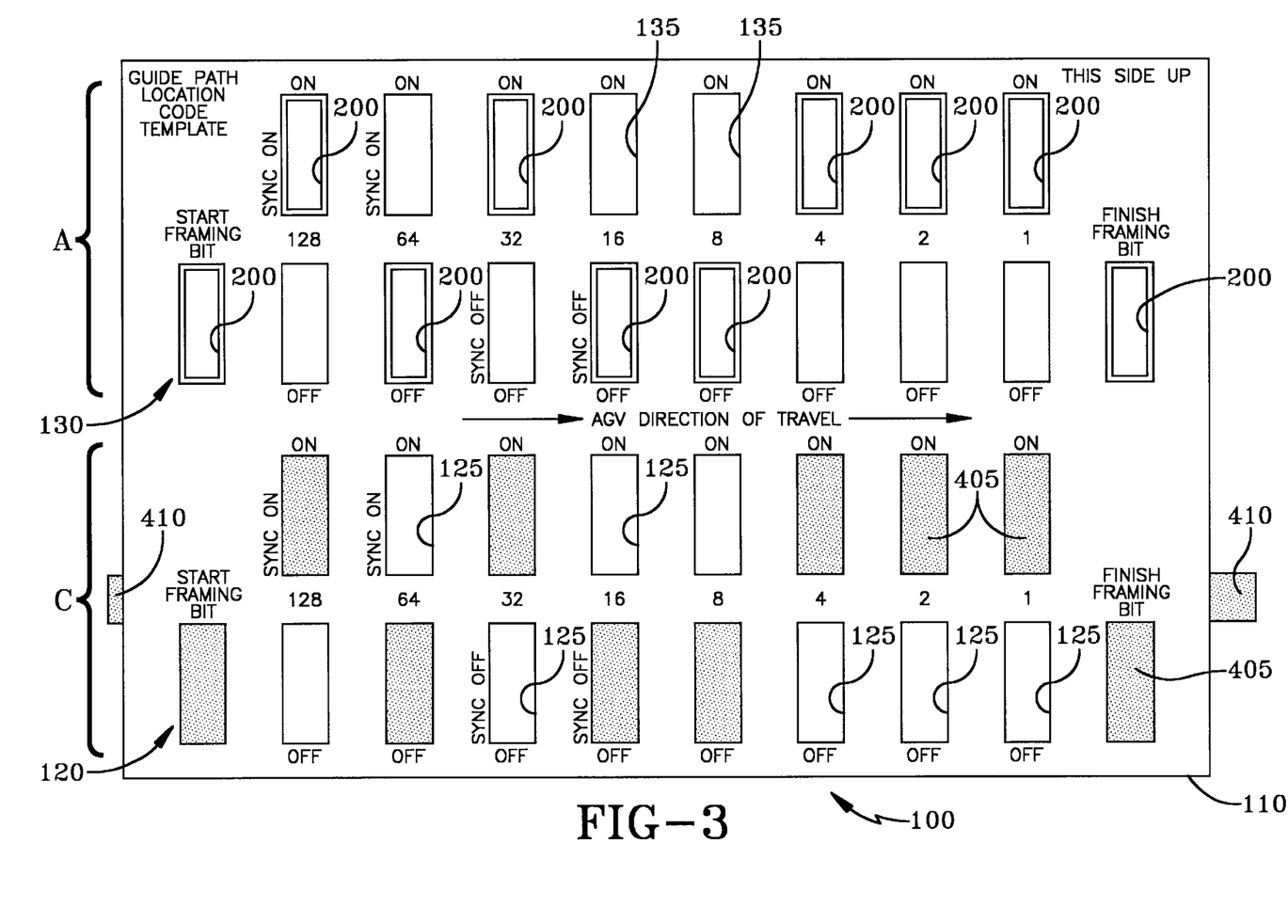
FIG. 3 is a plan view of the code template of FIG. 1 in use to apply code markings and code blocks to a surface.

The present invention is also directed to a method for removing and replacing automated guidance vehicle code markings using a code template, such as code template 100 for creating location code markings. With reference now to FIGS. 2, 3, and 4, FIG. 2 describes the various steps of the method, although certain of the steps may be accomplished in an order different from that described. FIG. 3 depicts the code template 100 during its use in removing and replacing a code marking block, such as the code block 400 of FIG. 4. An exemplary code block is illustrated in FIG. 4, which has been applied or removed and replaced using the code template 100. FIG. 4 also illustrates various other features that are discussed below in connection with certain aspects of the present invention. The location code block 400 in FIG. 4 includes code spurs 405 that are centered on a guide line 410, similar to those described in more detail in the above listed U.S. Patents.

In FIG. 2, the method of using the code template 100 starts in box 200 with the step of identifying an original code marking on a floor of a facility that must be newly applied or that has become damaged or worn and must be removed and replaced. Next, in box 205 a code template is selected, such as code template 100, that includes a generally planar template substrate 110 having control and alignment aperture patterns C and A, respectively, formed in the template substrate 110 and offset from each other. The code template 100 further includes a plurality of 120, 130 code spur openings 125, 135 that form the control and alignment aperture patterns C and A. Each of the openings 125 of the control aperture pattern C corresponds with an opening 135 of the alignment aperture pattern A and represents either a start, finish, on, or off bit.

With continued reference to FIGS. 2, 3, and 4, the next step represented by box 210 includes placing the code template 100 over the damaged or worn code markings or code block and aligning the control aperture pattern C with the code marking to be removed and replaced. Although a worn and/or damaged code block is not shown in the various figures, the code markings or code block will be similar to the location code marking or code block 400 shown in FIG. 4, except that certain of the code block spurs 405 would have been damaged or would exhibit signs of wear similar that demonstrated by the well-known roadside white and yellow traffic lines that fade over time.

Although this step illustrates, for purposes of example but not limitation, that the template 100 control pattern C is placed either over the area where a code block is to applied, or where the damaged or worn code block is to removed and replaced, each of the control and alignment patterns C and A are interchangeable. For example, the code template 100 and its method of use are equally compatible for use wherein the various steps described here are performed in an equivalent manner, whereby the alignment pattern A is placed over the code markings or code block on the facility floor, wall, or target. In this situation, the use of the template control and alignment patterns, C and A, are simply switched, one for the other. Also, even through the present method is primarily directed a use of the code template 100 for purposes of removing and replacing a damaged or worn code block, such as location code block 400 of FIG. 4, the code template of the present invention and its method for use is equally suitable for purposes of applying new code markings and code blocks. The placing step 210 can also optionally include an accuracy check whereby the facilities engineer checks the accuracy of the code markings or code block 400 to verify that the code spurs 405 are properly arranged along guide line 410 to reflect the desired location code. Location codes are described in more detail below. In this way, either before a new code block is applied or before an old code block is removed and replaced, the accuracy of the code block 400 can be verified using the indicia 140, 150, 155 of the code template 100.

In the next step of the instant method, as represented by box 215 of the flow chart of FIG. 2, the facilities engineer uses code template 100 to temporarily mark with traces 200 the offset location of the code spurs 405 of the code block 400 in the alignment pattern A of code template 100, which traces 200 correspond to the intended location of or the previously existing code spurs 405 of the original code marking 400. This can be accomplished in any of a number of acceptable ways, including temporarily marking with a lead or wax pencil the portion of the facility floor that is exposed in the code spur openings 135, 180, 185 of the alignment pattern A. Preferably, a bright orange, green, or yellow wax pencil is used so that the marks can be readily identified and yet later be easily removed without much difficulty after the new or replacement code spurs 405 are applied to the facility floor. The markings made in the alignment code spur openings 135, 190, 195 are preferably an outline trace 200 that borders the inner periphery of the openings as shown by example in FIG. 3, or any other type of similar marking that will enable the template 100 to be replaced over the traces or markings 200 and realigned once the template 100 has been removed from the code block 400.

In the next step identified by box 220, and after the markings or tracing step 215 is completed and preferably before the code template 100 is moved from its position, the accuracy of the traces or markings 200 can be verified against the original or intended code spurs 405 and the indicia 140, 150,160, 170, of the code template 100. The next step is represented by box 225 and includes removing the code template from the original code block 400 area of the facility floor. At step 230, the offset code spur traces or other markings 200, that were marked using the alignment aperture pattern A, are carefully preserved so that they remain intact until the code template 100 is returned to position for application of new or replacement code spurs 405.

The damaged or worn code marking spurs are removed at the next step represented by box 235 of FIG. 2. Typically, this is accomplished by burnishing or grinding the damaged or worn code spurs, not shown but described above, from the facility floor, wall, or other type of code block target. Next, at step 240, the code block surface is prepared and, if necessary primed with a coating, which is compatible for use with any of the wide variety of code spur paints and materials, such as those described above and in the previously listed U.S. Patents to Paske, Jr. et al. and Schultz. Alternatively, and even more preferably, this priming step can be accomplished after step 255 described below. In this optional alternative, the tracings described in at step 255 below can be better preserved to accommodate removal of the code template 100 before application of the code spur material.

Once the old code spurs have been removed and/or the surface of the code block target area has been prepared, then at step 245, the code template 100 is placed and positioned so that the code spur openings 135, 190, 195 of the alignment pattern A are aligned with the preserved code spur traces 200. It is recommended at step 250, if necessary, that the accuracy of the code spur traces 200 be verified again by checking them against the code template indicia 140, 150, 160, 170. As mentioned before in connection with preceding steps of the method, the patterns C and A are interchangeable for purposes of this step.

Then at step 255, the location of the new or replacement code spurs 405 can be marked or traced in the template code spur openings 125, 180, 185, of the plurality 120, in a manner similar to that already explained in connection with step 215. Those with skill in the art will appreciate that the method of tracing outlines for or marking the locations of the new or replacement code spurs must not interfere with the adhesion characteristics of the code spur material. For example, use of the aforementioned wax pencils may be less desirable than use of a permanent marker or lead pencil because certain paints may not adhere well to the floor of the facility surface in the presence of a wax substance. Preferably, the code spur tracings can be accomplished using any of a wide-variety of permanent markers, also commonly referred to as "magic markers", which are less susceptible to damage or alteration. Optionally, at this step 255, with the code template 100 remaining in position, no traces or marks need be made if the user instead elects to apply the new or replacement code spurs 405 directly through the template code spur openings 125, 180, 185. However, as will be understood by those with skill in the art, such direct application over the template may degrade the template and possibly obscure the various indicia 140, 150, 155, 160, 170 of the code template 100.

In the next step represented by box 260, the code template is removed from its position on the facility floor. As noted above with respect to step 240, the surface area that has been inscribed with the trace indicia can be primed before proceeding to step 265. To restate the preceding variation, the trace lines can be better preserved by priming the corresponding surface area with a primer material so that the new code spurs can be easily applied over the traces. Priming over the traces reduces the possibility that the traces will be damaged or inadvertently altered before application of the new code spurs. If the new or replacement code spurs 405 were not applied in the preceding steps, then in box 265, the new or replacement code spurs 405 are applied about the guide line 410 and within the boundaries of the traces as shown in FIG. 4. The applied code spur material is confined to the bounds of the traced outlines so that the code spurs 405 are as shown in the exemplary illustration of FIG. 4. If necessary, the freshly applied code spur material is allowed to cure or dry. If required, the next step of box 270 includes application of a sealer material that is adapted to improve the durability and the life of the code spur material. Lastly, if required, the step represented by box 275 can include replacing the code template 100 over the newly applied code block 400 to verify the accuracy of the code spurs 405 by comparison with the various indicia 140, 150, 160, 170 of the code template 100.

The indicia illustrated in FIG. 4 are in parentheses for references purposes only and are not usually transferred to the floor of the facility as part of applying the new or replacement location code block. However, each of the variations of the location code template 100 are easily adapted to incorporate stencil-type lettering or other similar means that can be used to apply such indicia as part of the newly applied or replaced sync code block 400.

With continued reference to the indicia shown in parentheses in FIG. 4, an exemplary function of the location code block 400 is now briefly described. More extensive detail and background is disclosed in the previously listed U.S. Patents. A location code block, such as code block 400, can be used by AGVs to identify a specific location in the facility. Such locations are typically predesignated with an identifying number, such as, for example without limitation, location "167". In FIG. 4, the code block is configured to represent location 167 by arranging the code spurs 405 so that certain of the binary digits needed to represent the number 167 are in the "on" position. For example, the numbers 128, 32, 4, 2, and 1, shown in parentheses in FIG. 4, depict the numbers assigned to or conventionally represented by the binary digits, or base 2 exponents. The code spur 405 labeled "128" represent the binary digit that stands for the base 2 exponent "7". In other words, 2 raised to the $7^{th}$ power. The sum of the binary digits represented by the code spurs 405 that are labeled to be in the "on" position, when summed together, equal 167. The binary digits positioned and labeled as "off" are place holders that are recognized by the sensors of the AGV, but which are not added to the sum. The code spurs 405 that are labeled "Start Framing Bit" and "Finish Framing Bit" are used to alert the AGV sensors to the start and end of a location code in the code block 400 and also serve to distinguish location code blocks from other types of code blocks, such as synchronization code blocks, which are described in more detail below.

Figure 5:
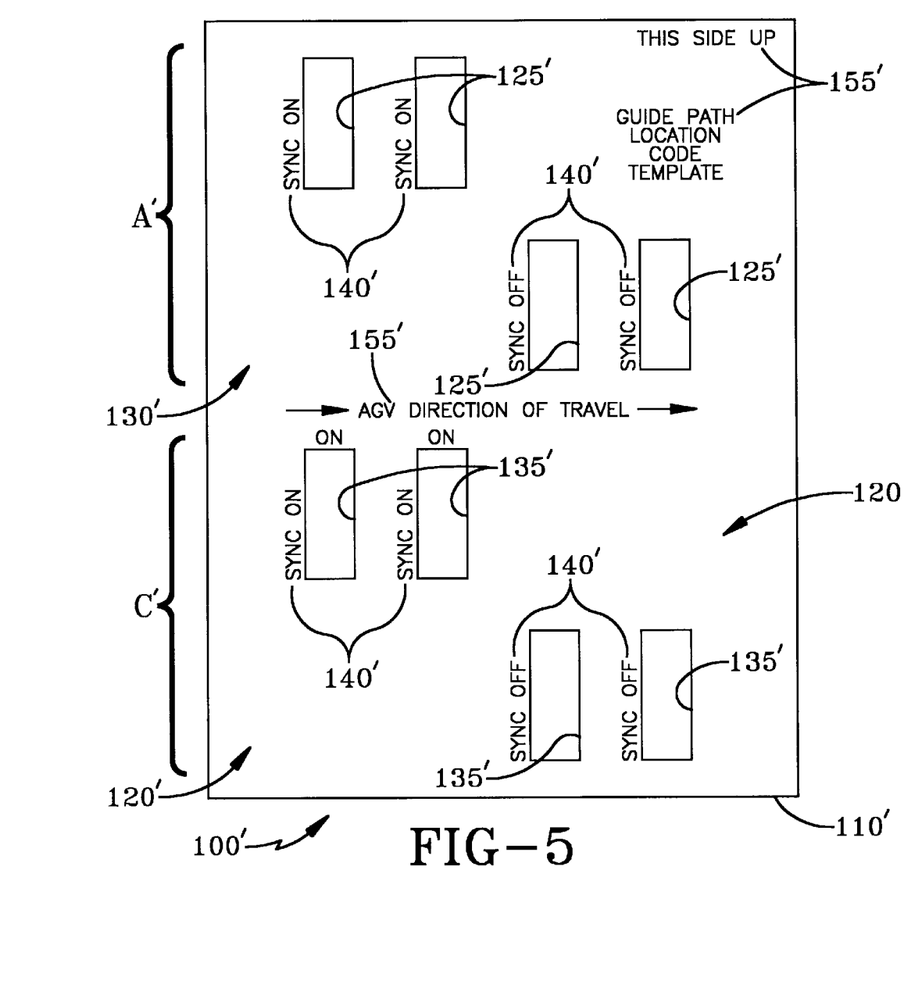
FIG. 5 is a plan view, in reduced scale, of a variation of the code template shown in FIG. 1 and constructed according to the principles of the present invention.
Figure 6:
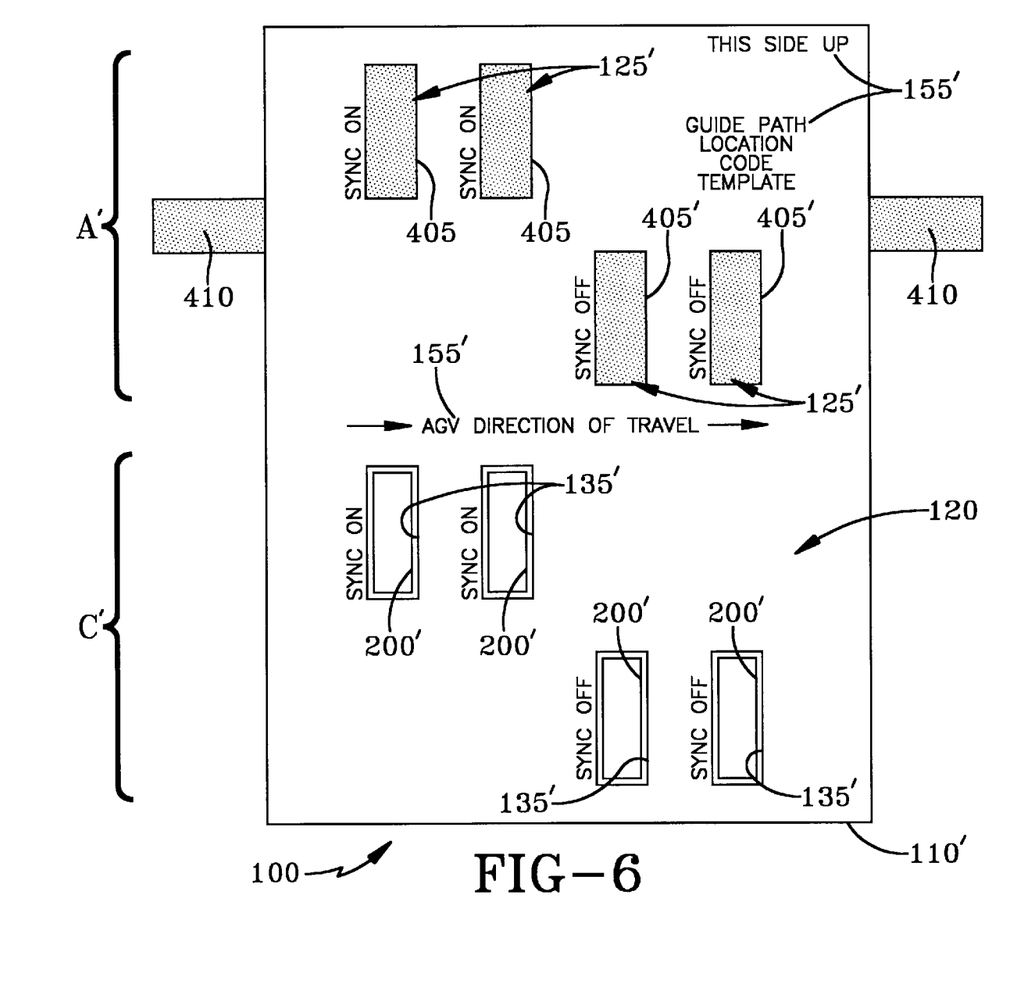
FIG. 6 is a plan view of the code marking template of FIG. 5 in use to apply code markings to a guide line.
Figure 7:
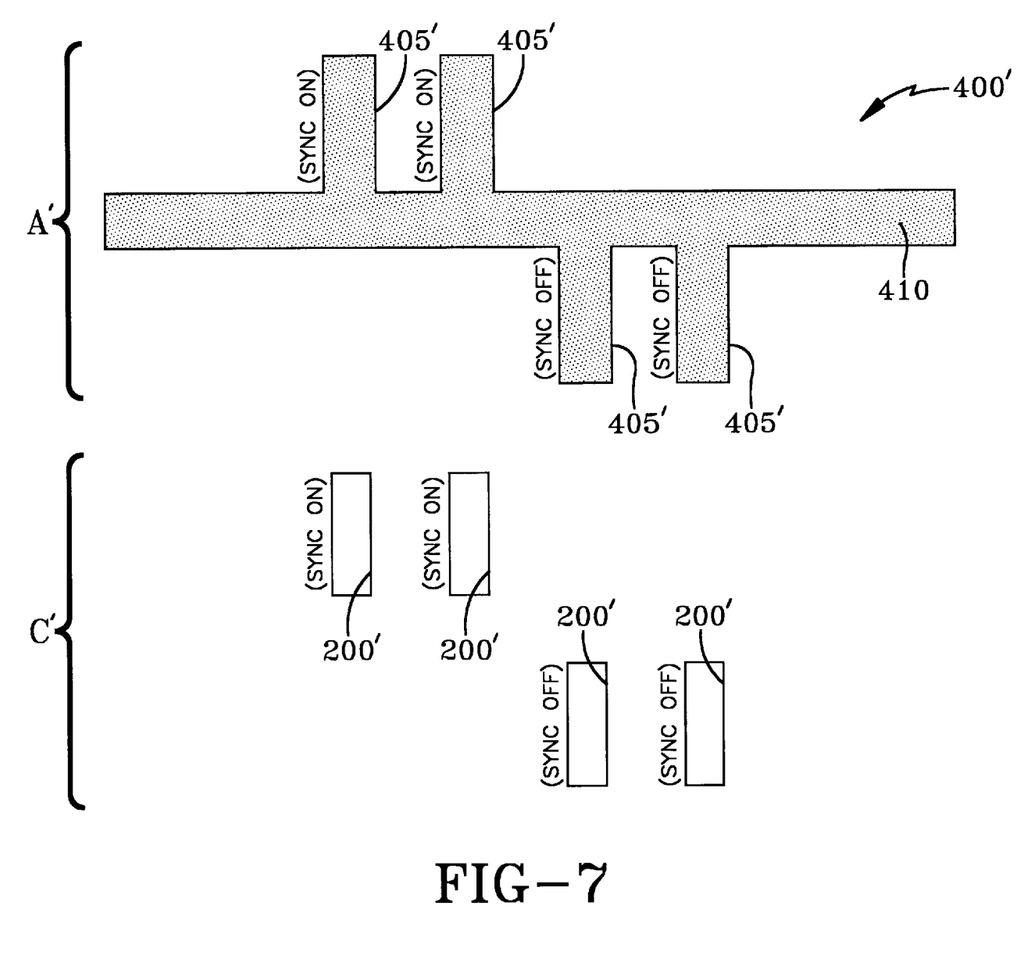
FIG. 7 is a plan view of code markings that have been applied using the code marking template of FIG. 5.

With reference next to FIGS. 5, 6, and 7, the present invention also contemplates an AGV code template for creating synchronization code markings or code blocks. With reference to FIG. 7, a synchronization code block is shown and is designated generally by reference numeral 400'. With continued reference to FIGS. 5, 6, and 7, this variation of the present invention further includes a generally planar template substrate 110' that has control and alignment aperture patterns C' and A' formed therein, which are offset from each other in a configuration similar to that of the code template 100 described above. A plurality 120', 130' of code spur openings 125', 135' forms the control and alignment aperture patterns C' and A'. Each of the code spur openings 125' of the control aperture pattern C' corresponds with an opening 135' of the alignment aperture pattern A' and represents either a synchronization (hereafter "sync") on or sync off bit as denoted in FIGS. 5, 6, and 7. This variation further preferably includes a series of indicia 140' corresponding to each of the code spur openings and is representative of a control spur bit identifier that describes, for purposes of illustration but not limitation, an exemplary function of the bit.

In FIG. 6, which is similar in description to FIG. 3, the same guide path line 410 is represented, which has proximate sync code spurs 405'. The code spurs 405' are shown appearing through the code spur openings 125' of the sync code template 100'. Trace outlines 200' are also shown in FIG. 6. In operation, the previously described method of use is equally adapted for use with the instant variation of the code template 100' when practiced in accordance with the principles of the present invention. FIG. 7 represents the newly applied or replaced sync code block 400' after the sync code template 100' has been removed. The traces 200' may be removed as previously discussed in connection with preceding variations. The indicia illustrated in FIG. 7 are in parentheses for references purposes only and are not usually transferred to the floor of the facility as part of the newly applied or replaced location code block 400. However, each of the variations of the sync code template 100' are easily adapted to incorporate stenciltype lettering or other similar means that can be used to apply such indicia as part of the newly applied or replaced sync code block 400'.

A kit of automated guidance vehicle code templates 100, 100' for creating synchronization and location code markings 400, 400' is also described according to the principles of the present invention. The kit includes a plurality of generally planar code templates 100, 100' each having control and alignment aperture patterns C, A, C', A' offset from each other and formed in the respective templates. A plurality 120, 130, 120', 130' of code spur openings 125, 135, 125', 135' form the respective control and alignment aperture patterns C, A, C', A'. Additionally, the kit contemplates code templates constructed and used in accordance with the embodiments and variations described above. As an additionally, variation of the preceding variations, the kit may include a single template, such as template 100 that is configured for creating both location and sync code markings and blocks as previously described.

While two types of code blocks, location code blocks 400 and sync code blocks 400' have been described in detail herein, many other types and configurations of floor-based, AGV compatible code blocks are presently in use. Further, while the present invention has been described primarily in connection with code blocks that are applied to a floor, such code blocks are also widely-used in various facilities on walls and other targets that are proximate to the path ways used by AGVs. Accordingly, numerous modifications and variations of the preferred embodiments disclosed herein will be apparent to those skilled in the art. For example, although specific embodiments have been described in detail, those with skill in the art can understand that the preceding embodiments and variations can be modified with various types of code spur openings and code template indicia for compatibility with the wide variety of guide lines, code markings, and code blocks presently in use in the industries already described. Accordingly, even though only few variations of the present invention are described herein, it is to be understood that the practice of these additional modifications and variations and the equivalents thereof, are within the spirit and scope of the invention as defined in the following claims.

We claim:

1. An automated guidance vehicle code template for creating location code markings, comprising:
    a generally planar template substrate;
    control and alignment aperture patterns formed in the template and correspondingly offset from each other; and
    a plurality of spaced-apart code spur openings forming the control and alignment aperture patterns wherein each of the openings of the control aperture pattern corresponds with an offset opening of the alignment aperture pattern and represents either a start, finish, on, or off bit.

2. The automated guidance vehicle code template of claim 1, further comprising:
    a series of indicia corresponding to each of the code spur openings and representative of a control spur bit identifier.

3. The automated guidance vehicle code template of claim 1, wherein the plurality of code spur openings of each said pattern includes at least a start framing bit opening and a finish framing bit opening.

4. The automated guidance vehicle of code template claim 1, wherein the plurality of code spur openings of each said pattern includes start and finish framing bit openings and at least 2 on bit and 2 off bit code spur openings.

5. The automated guidance vehicle code template of claim 1, wherein the plurality of code spur openings of each said pattern includes start and finish framing bit openings and at least 8 on bit and 8 off bit code spur openings.

6. An automated guidance vehicle code template for creating synchronization code markings, comprising:
    a generally planar template substrate;
    control and alignment aperture patterns formed in the template and correspondingly offset from each other; and
    a plurality of spaced-apart code spur openings forming the control and alignment aperture patterns wherein each of the openings of the control aperture pattern corresponds with an offset opening of the alignment aperture pattern and represents either a sync on or sync off bit.

7. The automated guidance vehicle code template of claim 6, further comprising:
    a series of indicia corresponding to each of the code spur openings and representative of a control spur bit identifier.

8. A kit of automated guidance vehicle code templates for creating synchronization and location code markings, comprising:
    a plurality of generally planar code templates;
    control and alignment aperture patterns correspondingly offset from each other and formed in each of the templates; and
    a plurality of spaced-apart code spur openings forming the control and alignment aperture patterns wherein each of the openings of the control aperture pattern corresponds with an offset opening of the alignment aperture pattern and represents either a start, finish, on, off, sync on, or sync off bit.

9. The kit of automated guidance vehicle code templates according to claim 8, further comprising:
    a series of indicia corresponding to each of the code spur openings and representative of a control spur bit identifier.

10. The kit of automated guidance vehicle code templates according to claim 8 wherein the plurality of code spur openings of each said pattern includes at least a start framing bit opening and a finish framing bit opening.

11. The kit of automated guidance vehicle code templates of claim 8, wherein the plurality of code spur openings of each said pattern includes start and finish framing bit openings and at least 2 on bit and 2 off bit code spur openings.

12. The kit of automated guidance vehicle code templates of claim 8, wherein the plurality of code spur openings of each said pattern includes start and finish framing bit openings and at least 8 on bit and 8 off bit code spur openings.

13. The kit of automated guidance vehicle code templates of claim 8, wherein the plurality of code spur openings forming the control pattern corresponds with an opening of the alignment aperture pattern and represents either a sync on or sync off bit.

14. The kit of automated guidance vehicle code templates of claim 8, wherein the plurality of code spur openings forming the control pattern corresponds with an opening of the alignment aperture pattern and represents either a sync on or sync off bit; and
    wherein the plurality of code spur openings includes start and finish framing bit openings and at least 2 on bit and 2 off bit code spur openings.

15. The kit of automated guidance vehicle code templates of claim 8, wherein the plurality of code spur openings forming the control pattern corresponds with an opening of the alignment aperture pattern and represents either a sync on or sync off bit; and wherein the plurality of code spur openings includes start and finish framing bit openings and at least 8 on bit and 8 off bit code spur openings.

16. A method for removing and replacing automated guidance vehicle code markings using a code template for creating location code markings, comprising the steps of:

a. identifying an original code marking that has become damaged or worn;

b. selecting a code template that includes a generally planar template substrate having control and alignment aperture patterns formed in the template and correspondingly offset from each other and a plurality of spaced-apart code spur openings forming the control and alignment aperture patterns wherein each of the openings of the control aperture pattern corresponds with an offset opening of the alignment aperture pattern and represents either a start, finish, on, or off bit;

c. placing the code template over the damaged or worn code marking and aligning the control aperture pattern with the code marking to be removed and replaced;

d. temporarily marking the code spurs in the alignment pattern with offset traces that correspond to the marked code spurs of the original code marking;

e. removing the code template from the original code marking area;

f. preserving the offset code spur traces that were marked using the alignment aperture pattern;

g. removing the damaged or worn code marking spurs;

h. placing and positioning the code template to align the alignment aperture pattern with the preserved code spur traces;

i. marking the code spurs in the control aperture pattern corresponding to the preserved code spurs in the alignment aperture pattern; and j. applying replacement code spurs.

17. The method according to claim 16, further including the steps of identifying and annotating the information represented by the damaged or worn code spurs before removal and verifying the accuracy of the information represented by the code spurs marked in the alignment aperture pattern before the replacement code spurs are applied.

18. The method according to claim 16, further including the step of preparing the surface where the damaged or worn code spurs were removed before applying the replacement code spurs.

19. The method according to claim 16, further including the step of removing the temporarily marked code spurs after application of the replacement code spurs.

20. The method according to claim 16, further including the step of applying a sealer to the replacement code spurs wherein the sealer is configured to improve resistance of the code spurs to damage and wear.

* * * * *